(12) United States Patent
Sata et al.

(10) Patent No.: US 12,334,509 B2
(45) Date of Patent: Jun. 17, 2025

(54) LAMINATED BATTERY AND MANUFACTURING METHOD FOR SAME

(71) Applicant: SHARP KABUSHIKI KAISHA, Sakai (JP)

(72) Inventors: Shunsuke Sata, Sakai (JP); Hirotaka Mizuhata, Sakai (JP); Tomo Kitagawa, Sakai (JP); Akihito Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 603 days.

(21) Appl. No.: 17/771,709

(22) PCT Filed: Sep. 29, 2020

(86) PCT No.: PCT/JP2020/036762
§ 371 (c)(1),
(2) Date: Apr. 25, 2022

(87) PCT Pub. No.: WO2021/079695
PCT Pub. Date: Apr. 29, 2021

(65) Prior Publication Data
US 2022/0384852 A1    Dec. 1, 2022

(30) Foreign Application Priority Data

Oct. 25, 2019  (JP) ................. 2019-194505

(51) Int. Cl.
*H01M 10/0585*  (2010.01)
*H01M 4/24*  (2006.01)
(Continued)

(52) U.S. Cl.
CPC ....... *H01M 10/0585* (2013.01); *H01M 4/244* (2013.01); *H01M 50/105* (2021.01);
(Continued)

(58) Field of Classification Search
CPC ............ H01M 10/0585; H01M 4/244; H01M 50/105; H01M 50/1385; H01M 50/466;
(Continued)

(56) References Cited

U.S. PATENT DOCUMENTS

2014/0333264 A1* 11/2014 Dai ................. H01G 11/36
 320/128
2018/0309093 A1* 10/2018 Amatucci ............ H01M 50/119
(Continued)

FOREIGN PATENT DOCUMENTS

JP   2000285903 A   10/2000
JP   2001319683 A   11/2001
(Continued)

*Primary Examiner* — Lisa S Park
(74) *Attorney, Agent, or Firm* — ScienBiziP, P.C.

(57) ABSTRACT

Provided are a laminated battery capable of suppressing a level drop of an electrolyte caused by expansion of a negative electrode active material during discharge, and a manufacturing method for the laminated battery.
An enclosure member of the laminated battery is constituted by affixing a first resin film and a second resin film to each other, and a separator is arranged inside the enclosure member between a positive electrode (for example, a first electrode) and a negative electrode (for example, a second electrode). A peripheral edge portion of the separator is fixed to a peripheral edge portion of the enclosure member (the first resin film or the second resin film).

15 Claims, 10 Drawing Sheets

(51) Int. Cl.
*H01M 50/105* (2021.01)
*H01M 50/138* (2021.01)
*H01M 50/466* (2021.01)
*H01M 12/08* (2006.01)

(52) U.S. Cl.
CPC ..... *H01M 50/1385* (2021.01); *H01M 50/466* (2021.01); *H01M 12/08* (2013.01)

(58) Field of Classification Search
CPC .. H01M 12/08; H01M 10/0436; H01M 10/24; H01M 10/30; H01M 12/065; H01M 50/121; H01M 50/124; H01M 10/04; H01M 10/0404; H01M 50/40; Y02E 60/10; Y02P 70/50

See application file for complete search history.

(56) References Cited

U.S. PATENT DOCUMENTS

2018/0337382 A1\* 11/2018 Iida ..................... H01M 50/417
2019/0103642 A1\* 4/2019 Rahman ................ H01M 4/134

FOREIGN PATENT DOCUMENTS

| JP | 2013-020724 | \* | 1/2013 |
| JP | 2013-069493 | \* | 4/2013 |
| JP | 2013069493 A | | 4/2013 |
| JP | 2018195495 A | | 12/2018 |
| JP | 2019145724 A | | 8/2019 |
| WO | 2019203130 A1 | | 10/2019 |

\* cited by examiner

FIG. 9
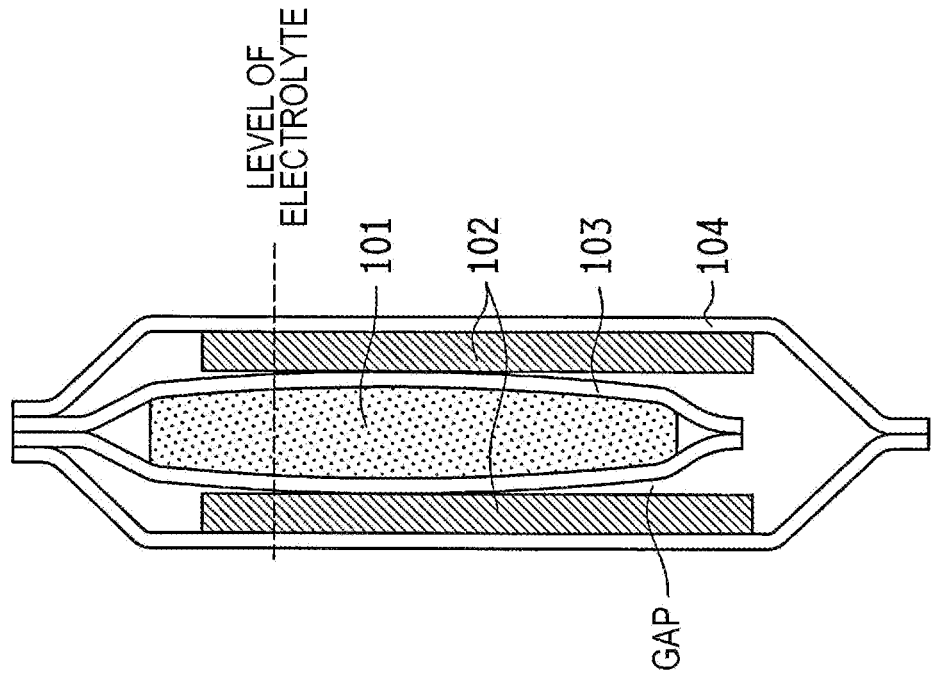
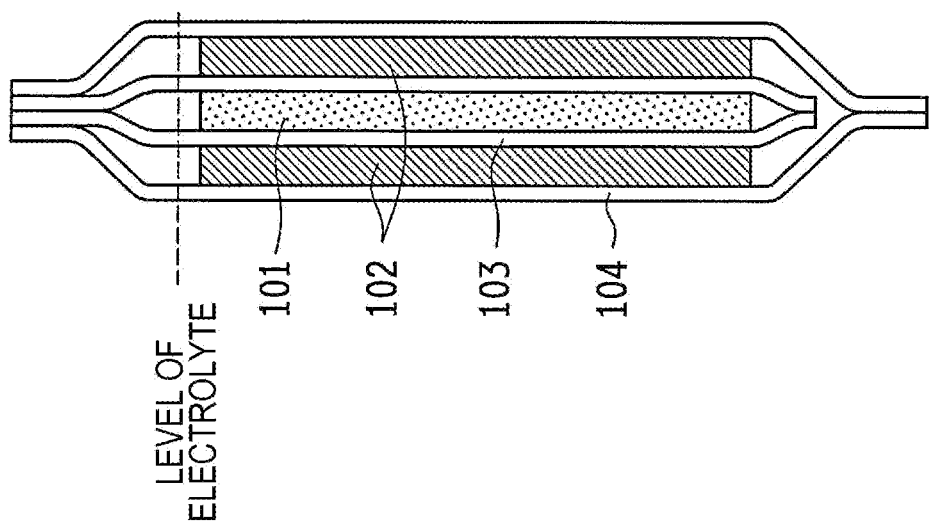

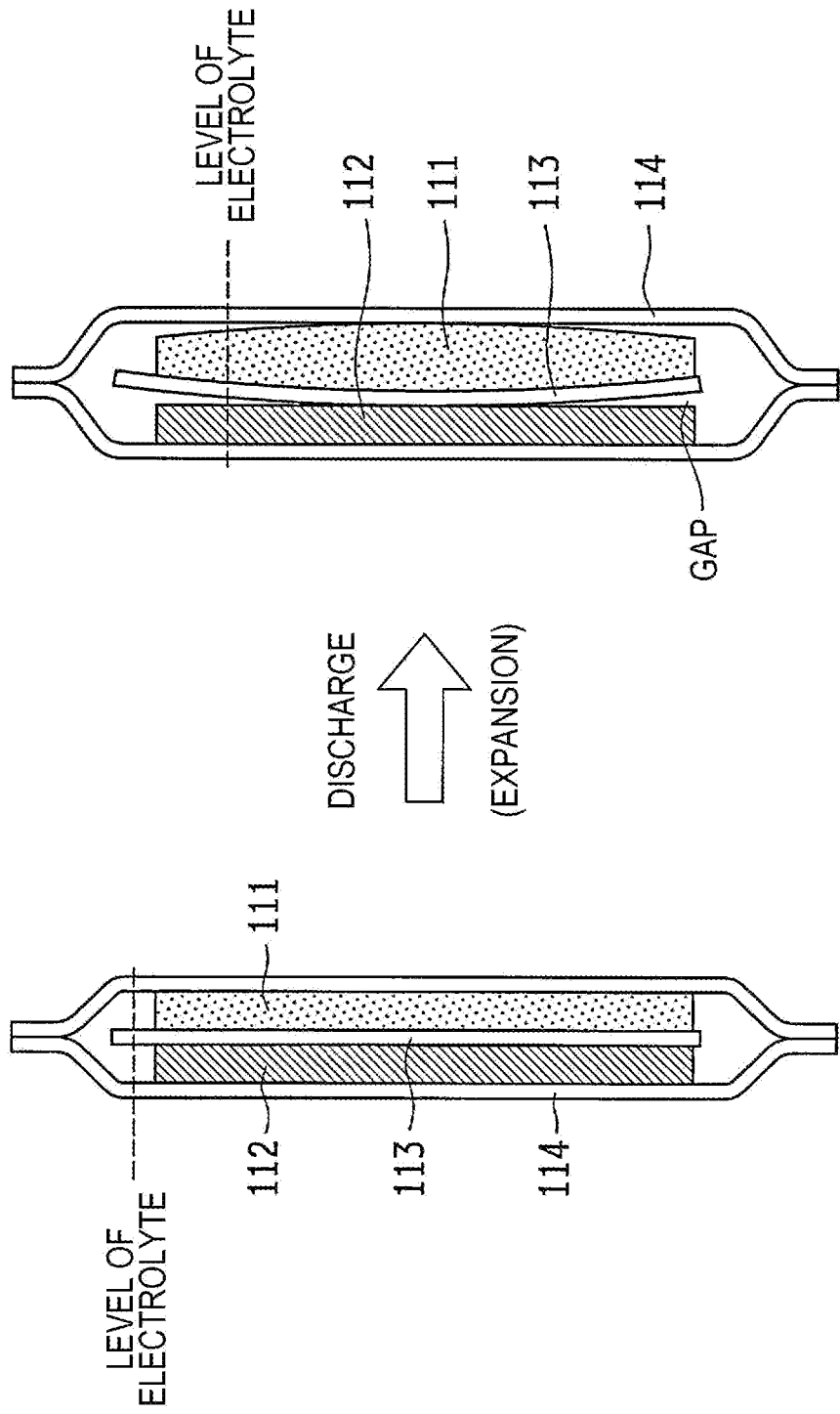

LAMINATED BATTERY AND MANUFACTURING METHOD FOR SAME

TECHNICAL FIELD

The present disclosure relates to a laminated battery including a positive electrode, a negative electrode, and a separator that are laminated inside an enclosure member, and further relates to a manufacturing method for the laminated battery.

This application claims priority based on Japanese Patent Application No. 2019-194505 filed Oct. 25, 2019 in Japan, the entire contents of which are incorporated herein by reference.

BACKGROUND ART

Recently, a laminated battery has been put into practical use in which a positive electrode, a negative electrode, and a separator are laminated in an enclosure member (specifically, in which the separator is disposed between the positive electrode and the negative electrode). In some of the type of laminated battery, a bag separator is used as a storage for a negative electrode active material or a positive electrode active material. For example, Patent Literature (PTL) 1 discloses a rectangular alkaline storage battery in which a positive electrode and a negative electrode each including a tab for connection to a current collector terminal on a lateral side are laminated, and in which at least one of the positive electrode and the negative electrode is wrapped with a bag separator.

CITATION LIST

Patent Literature

PTL 1: Japanese Unexamined Patent Application Publication No. 2001-319683

SUMMARY OF INVENTION

Technical Problem

When metal, such as zinc, is used as the negative electrode active material, change in volume (expansion) of the negative electrode active material occurs during a process of oxidation in which the metal is oxidated into an oxide due to a discharge reaction. On that occasion, as illustrated in FIG. 9, if a negative electrode 101 including the negative electrode active material is disposed in a bag separator 103, the bag separator 103 deforms following the expansion of volume of the negative electrode active material during discharge. On the other hand, because a positive electrode 102 has lower flexibility than the bag separator 103, an enclosure member 104 of a battery cannot follow the deformation of the bag separator 103. As a result, the negative electrode 101 and the bag separator 103 move upward in FIG. 9, whereby positions of the negative electrode 101 and the positive electrode 102 are shifted from each other and a gap is generated between the bag separator 103 and the positive electrode 102.

When an electrolyte moves to fill the gap generated as mentioned above, a problem arises in that, because a level of the electrolyte drops, portions of the electrodes (the positive electrode 102 and the negative electrode 101) come into a state not wetted with the electrolyte and a battery capacity reduces. Moreover, in the case of the laminated battery being a secondary battery, if the electrode portions not wetted with the electrolyte generate, a current is caused to concentrate on the remaining electrode portions (regions wetted with the electrolyte). This results in a possibility of reduction in charge-discharge cycle life.

Although the above-described problem occurs noticeably when the negative electrode active material is disposed in the bag separator, the occurrence of the problem is not always premised on a situation that the bag separator is used. There is a similar problem, for example, when a negative electrode 111 and a positive electrode 112 are arranged, as illustrated in FIG. 10, inside an enclosure member 114 with one sheet of separator 113 interposed between both the electrodes.

The present disclosure has been accomplished in consideration of the above-described problem, and an object of the present disclosure is to provide a laminated battery capable of suppressing a level drop of an electrolyte caused by expansion of a negative electrode active material during discharge, and to further provide a manufacturing method for the laminated battery.

Solution to Problem

To solve the above-described problem, a first aspect of the present disclosure provides a laminated battery including a positive electrode, a negative electrode, and a separator that are laminated inside an enclosure member, wherein the enclosure member is constituted by affixing a first resin film and a second resin film to each other, the separator is arranged inside the enclosure member between the negative electrode and the positive electrode, and peripheral edge portion of the separator is fixed to a peripheral edge portion of at least one of the first resin film and the second resin film.

With the feature described above, even when the negative electrode is expanded due to discharge, a shift in position of the separator is suppressed because the peripheral edge portion of the separator is fixed to the enclosure member. Therefore, a space in which the positive electrode is disposed deforms following deformation of a space in which the negative electrode is disposed, and a gap can be avoided from being formed between the positive electrode and the separator. As a result, a level drop of an electrolyte is suppressed, and reduction in battery capacity can be suppressed. In addition, when the laminated battery is a secondary battery, reduction in cycle life can also be suppressed.

To solve the above-described problem, a second aspect of the present disclosure provides a manufacturing method for the above-described laminated battery, the manufacturing method including a first step of laminating the positive electrode on the first resin film to face each other, a second step of laminating the separator on the positive electrode and welding a peripheral edge portion of the separator to a peripheral edge portion of the first resin film, a third step of laminating a current collector of the negative electrode on the separator, a fourth step of laminating the second resin film to face the current collector of the negative electrode and welding the first resin film and the second resin film along three sides except for one side, and a fifth step of loading particles of a negative electrode active material for the negative electrode and an electrolyte through an opening at the one side where the resin films have not been welded in the fourth step, and thereafter welding the resin films along the side that has been left open.

With the feature described above, since the separator is bonded to the first resin film forming the enclosure member, the battery can be assembled through the above-described steps just by laminating and welding the individual members in the first to fourth steps. As a result, a manufacturing process can be simplified, and cost reduction can be realized.

Advantageous Effects of Invention

In the laminated battery according to the present disclosure, even when the negative electrode is expanded due to the discharge, the space in which the positive electrode is disposed deforms following the deformation of the space in which the negative electrode is disposed, and a gap can be avoided from being formed between the positive electrode and the separator. This results in an advantageous effect that a level drop of the electrolyte is suppressed, and reduction in battery capacity can be suppressed. Another advantageous effect is obtained in that, when the laminated battery is a secondary battery, reduction in cycle life can also be suppressed.

BRIEF DESCRIPTION OF DRAWINGS

FIG. 1(a) is a plan view of the laminated battery, FIG. 1(b) is a sectional view taken along A-A in FIG. 1(a), and FIG. 1(c) is a partial enlarged view of FIG. 1(b).

FIG. 3(a) is a plan view of the laminated battery, and FIG. 3(b) is a sectional view taken along A-A in FIG. 3(a).

FIG. 6(a) is a plan view of the laminated battery, and FIG. 6(b) is a sectional view taken along A-A in FIG. 6(a).

FIG. 9 represents explanatory sectional views illustrating change in shape of a laminated battery of related art, the change being attributable to discharge.

FIG. 10 represents explanatory sectional views illustrating change in shape of another laminated battery of related art, the change being attributable to discharge.

DESCRIPTION OF EMBODIMENTS

Embodiments of the present disclosure will be described in detail below with reference to the drawings.

Embodiment 1

Figure 1:
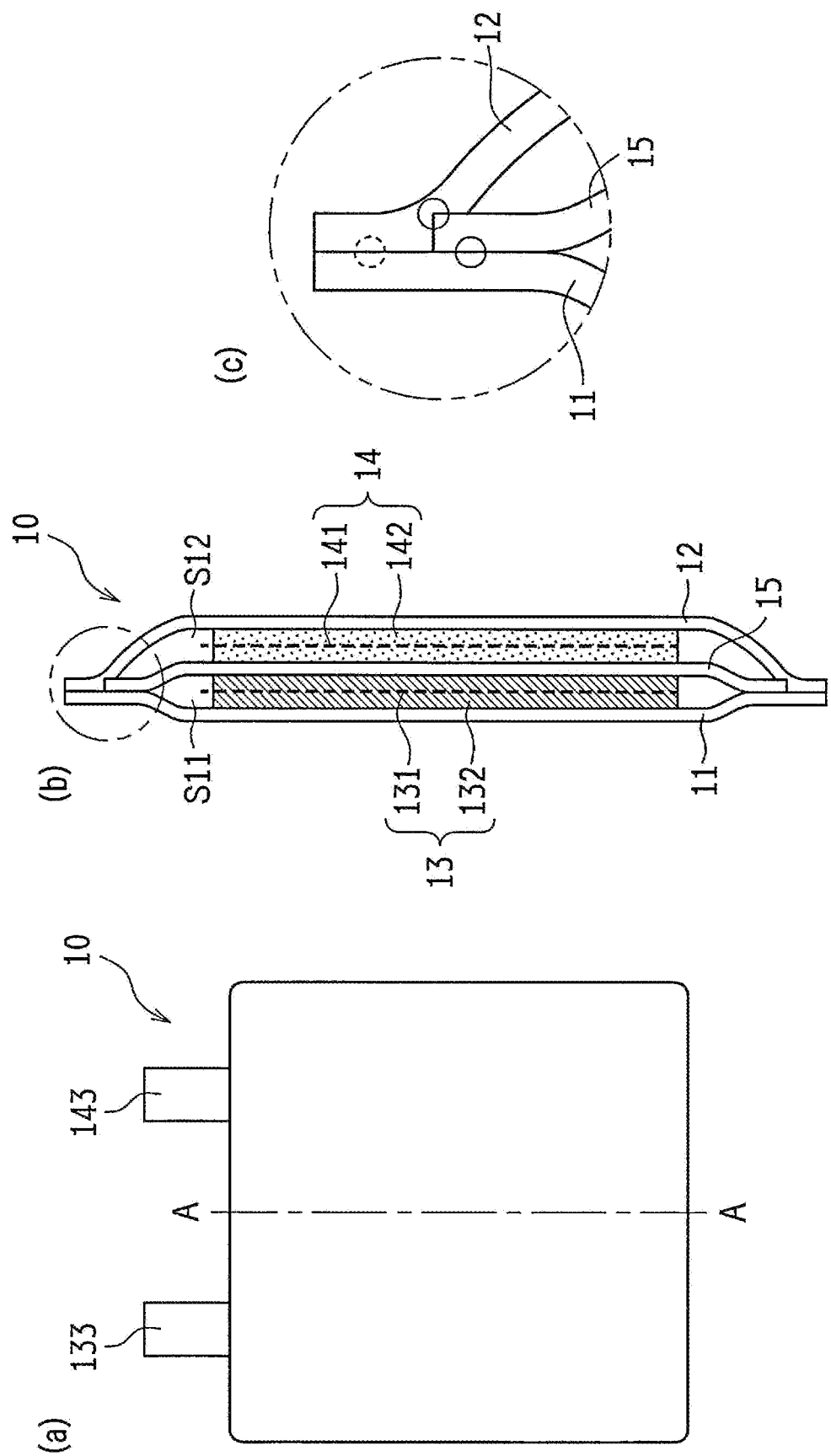
FIG. 1 illustrates a schematic structure of a laminated battery according to Embodiment 1; specifically.

FIG. 1 illustrates a schematic structure of a laminated battery 10 according to Embodiment 1; specifically, FIG. 1(a) is a plan view of the laminated battery 10, FIG. 1(b) is a sectional view taken along A-A in FIG. 1(a), and FIG. 1(c) is a partial enlarged view of FIG. 1(b).

As illustrated in FIG. 1, in the laminated battery 10, an enclosure member (battery case) is constituted by affixing a first resin film 11 and a second resin film 12 to each other. The laminated battery 10 includes a first electrode 13, a second electrode 14, and a separator 15 that are disposed inside the enclosure member. Furthermore, an electrolyte (not illustrated) is filled in the enclosure member. In the following, for convenience of explanation, it is assumed that an upper side in the drawing of FIG. 1 is an upper side of the laminated battery 10.

In the laminated battery 10, a peripheral edge portion of the separator 15 is fixed to the enclosure member. FIG. 1(c) is an enlarged view illustrating an end portion of the laminated battery 10. In the enlarged view, a portion surrounded by a solid circle represents a portion in which the separator 15 is bonded to the enclosure member by heat welding or ultrasonic welding, for example, and a portion surrounded by a dashed-line circle represents a portion in which the enclosure member is preferably to be welded.

Here, the separator 15 is arranged to face the first resin film 11, and a peripheral edge portion of the separator 15 is bonded to a peripheral edge portion of the first resin film 11. A space between the first resin film 11 and the separator 15 serves as a first storage portion S11, and the first electrode 13 is disposed in the first storage portion S11. A thickness of the first resin film 11 is not limited to a particular value, but it is preferably 0.02 mm to 0.25 mm. If the thickness of the first resin film 11 is less than 0.02 mm, there is a possibility that the first resin film 11 may not be sufficiently fused to the second resin film 12 during the welding and bonding strength may become insufficient. On the other hand, if the thickness of the first resin film 11 exceeds 0.25 mm, there is a possibility that, because the film becomes hard to stretch, stress may be concentrated on a portion welded to the second resin film 12 with expansion of the battery and the welded portion may be peeled off. The first resin film 11 is preferably formed using a thermoplastic resin material with high alkali resistance and can be made of, for example, a film of polyolefin resin such as polypropylene or polyethylene. For reinforcement, a resin film layer made of nylon or polyethylene terephthalate, for example, or a metal film layer made of an aluminum foil or a stainless foil, for example, may be laminated on the first resin film 11.

The second resin film 12 is arranged to face the separator 15 on an opposite side to the first resin film 11. A peripheral edge portion of the second resin film 12 is also bonded to a peripheral edge portion of the separator 15. A bonded region between the peripheral edge portion of the separator 15 and the peripheral edge portion of the first resin film 11 and a bonded region between the peripheral edge portion of the separator 15 and the peripheral edge portion of the second resin film 12 may overlap each other or may be located at different positions. The peripheral edge portion of the second resin film 12 is preferably bonded to the peripheral edge portion of the first resin film 11 as well. A space between the second resin film 12 and the separator 15 serves as a second storage portion S12, and the second electrode 14 is disposed in the second storage portion S12. A material of the second resin film 12 can be selected as appropriate from among the resin films that can be used for the first resin film 11. A thickness of the second resin film 12 is preferably 0.02 mm to 0.25 mm for the same reason as that described above for the first resin film 11.

Although, in the above-described example, the peripheral edge portion of the separator 15 is fixed to both the peripheral edge portion of the first resin film 11 and the peripheral edge portion of the second resin film 12, the peripheral edge portion of the separator 15 just needs to be fixed to at least one of the peripheral edge portions of the first resin film 11 and the second resin film 12.

Either one of the first electrode 13 and the second electrode 14 functions as a positive electrode, and the other electrode functions as a negative electrode. The first electrode 13 and the second electrode 14 are in the form obtained by laminating active material layers 132 and 142 on current collectors 131 and 141, respectively. Parts of the current collectors 131 and 141 are extended to the outside of the enclosure member and serve respectively as lead portions 133 and 143 of the laminated battery 10. The lead portion 133 is not always required to be part of the current collector 131, and the current collector 131 just needs to be electrically connected to the lead portion 133 that is exposed to the outside of the enclosure member. Similarly, the lead portion 143 is not always required to be part of the current collector 141, and the current collector 141 just needs to be electrically connected to the lead portion 143 that is exposed to the outside of the enclosure member.

The laminated battery 10 according to Embodiment 1 is featured in the structure that the peripheral edge portion of the separator 15 is fixed to the enclosure member, and component materials of the laminated battery 10 and so on are not limited to specific ones. In other words, the first resin film 11, the second resin film 12, the first electrode 13, the second electrode 14, the separator 15, and the electrolyte can be each given by suitable one of related-art components that have been used so far in the field of laminated batteries. For example, a porous polyolefin film can be used for the separator 15. Alternatively, an ion exchange film can also be used for the separator 15. For example, zinc particles can be utilized for the negative electrode active material used in the negative electrode. When the laminated battery 10 is a secondary battery, the negative electrode active material may contain zinc oxide particles. For example, nickel oxyhydroxide can be used for the positive electrode active material used in the positive electrode. A thickness of the separator 15 is not limited to a particular value, but it is preferably 0.05 mm to 0.4 mm. If the thickness of the separator 15 is less than 0.05 mm, there is a possibility that the separator 15 may be broken due to volume change of the negative electrode active material. On the other hand, if the thickness of the separator 15 exceeds 0.4 mm, there is a possibility that a battery power output may be reduced with an increase of internal resistance.

Figure 2:
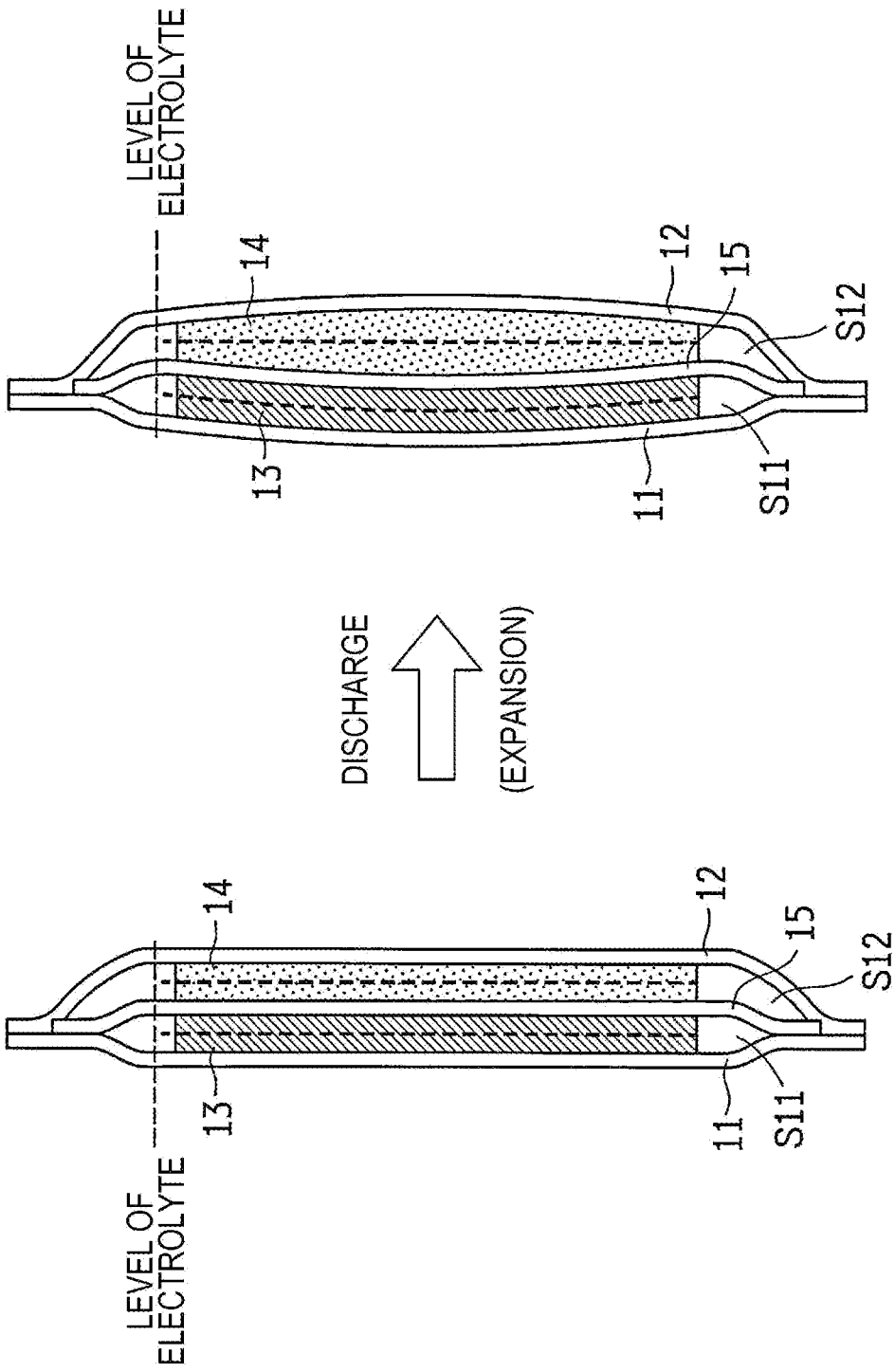
FIG. 2 represents explanatory sectional views illustrating change in shape of the laminated battery of FIG. 1, the change being attributable to discharge.

In the laminated battery 10 as well, the negative electrode active material used in the negative electrode causes change in volume (expansion) during discharge, and hence the shape of the laminated battery 10 is also changed. FIG. 2 represents explanatory sectional views illustrating change in shape of the laminated battery 10, the change being attributable to the discharge. FIG. 2 illustrates the case in which the second electrode 14 is the negative electrode (and the first electrode 13 is the positive electrode).

As illustrated in FIG. 2, in the laminated battery 10, even when the negative electrode (the second electrode 14 in this embodiment) is expanded due to the discharge, a shift in position of the separator 15 is suppressed because the peripheral edge portion of the separator 15 is fixed to the enclosure member (the first resin film 11 in this embodiment). Therefore, the first storage portion S11 deforms following deformation of the second storage portion S12 in which the second electrode 14 is disposed, and a gap can be avoided from being formed between the first electrode 13 serving as the positive electrode and the separator 15. As a result, a level drop of the electrolyte is suppressed, and reduction in battery capacity can be suppressed. In addition, when the laminated battery 10 is a secondary battery, reduction in cycle life can also be suppressed.

Embodiment 2

While Embodiment 1 discloses the battery structure when the present disclosure is applied to a general battery, a preferred battery structure in the case of applying the present disclosure to a metal-air battery is described in this Embodiment 2.

Figure 3:
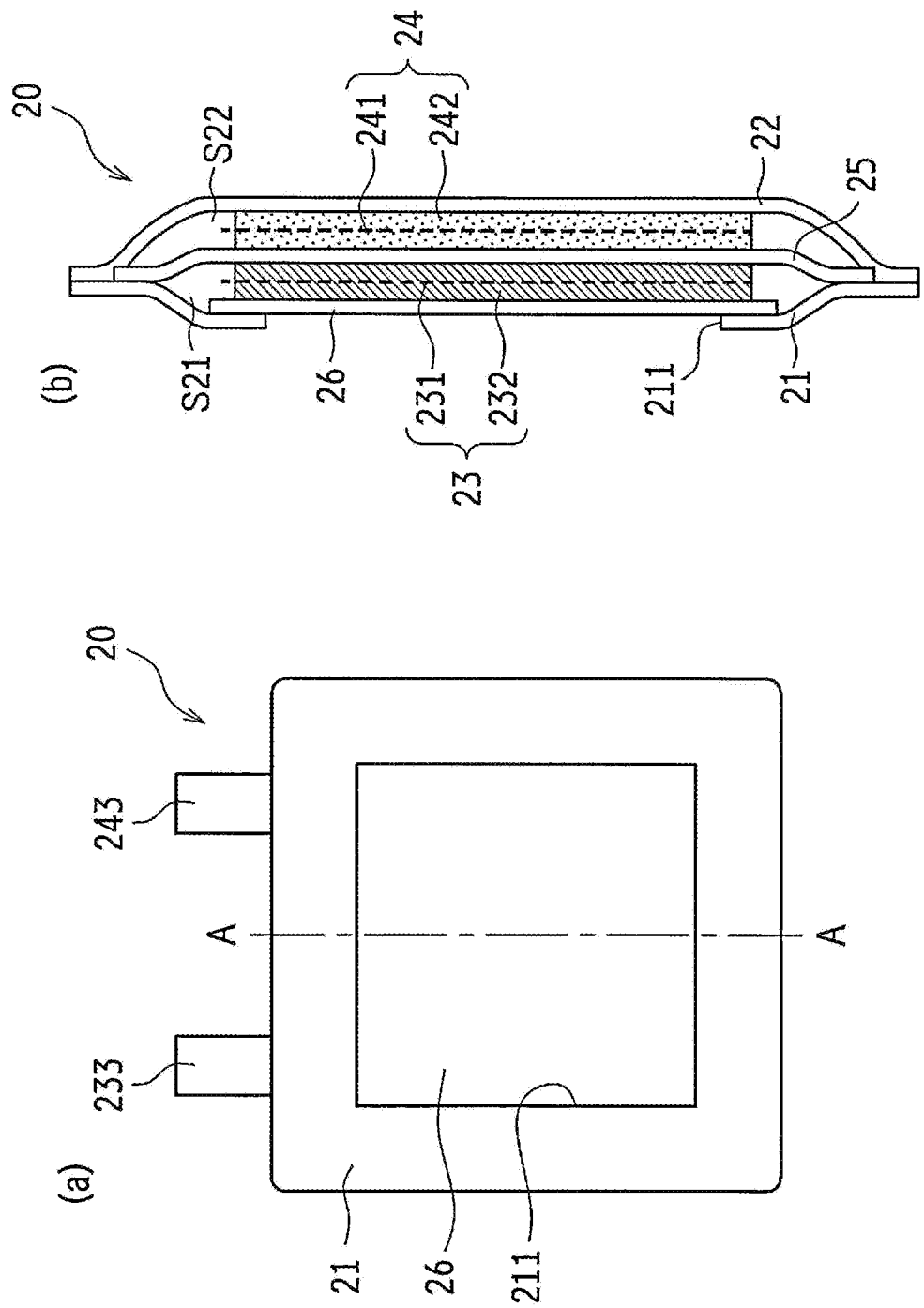
FIG. 3 illustrates a schematic structure of a laminated battery according to Embodiment 2; specifically.

FIG. 3 illustrates a schematic structure of a laminated battery 20 according to Embodiment 2; specifically, FIG. 3(a) is a plan view of the laminated battery 20, and FIG. 3(b) is a sectional view taken along A-A in FIG. 3(a).

As illustrated in FIG. 3, in the laminated battery 20, an enclosure member (battery case) is constituted by affixing a first resin film 21 and a second resin film 22 to each other. The laminated battery 20 includes an air electrode 23, a metal negative electrode 24, a separator 25, and a water repellent film 26 that are disposed inside the enclosure member. Furthermore, an electrolyte (not illustrated) is filled in the enclosure member.

The separator 25 is arranged to face the first resin film 21, and a peripheral edge portion of the separator 25 is bonded to a peripheral edge portion of the first resin film 21. A space between the first resin film 21 and the separator 25 serves as a first storage portion S21, and the air electrode 23 and the water repellent film 26 are disposed in the first storage portion S21. In more detail, an air inlet 211 is formed in the first resin film 21 as an opening through which air is to be taken in, and the water repellent film 26 is bonded to the first resin film 21 to cover the air inlet 211 from an inner side. The air electrode 23 is arranged between the water repellent film 26 and the separator 25. Details of the air electrode 23 and the water repellent film 26 will be described later.

The second resin film 22 is arranged to face the separator 25 on an opposite side to the first resin film 21. A peripheral edge portion of the second resin film 22 is also bonded to a peripheral edge portion of the separator 25. A bonded region between the peripheral edge portion of the separator 25 and the peripheral edge portion of the first resin film 21 and a bonded region between the peripheral edge portion of the separator 25 and the peripheral edge portion of the second resin film 22 may overlap each other or may be located at different positions. The peripheral edge portion of the second resin film 22 is preferably bonded to the peripheral edge portion of the first resin film 21 as well. A space between the second resin film 22 and the separator 25 serves as a second storage portion S22, and the metal negative electrode 24 is disposed in the second storage portion S22.

Although, in the above-described example, the peripheral edge portion of the separator 25 is bonded to both the peripheral edge portion of the first resin film 21 and the peripheral edge portion of the second resin film 22, the peripheral edge portion of the separator 15 just needs to be fixed to at least one of the peripheral edge portions of the first resin film 21 and the second resin film 22.

The water repellent film 26 is disposed to prevent leakage of the electrolyte through the air inlet 211 and has a function of separating gas and liquid. The water repellent film 26 is fixed to the first resin film to cover the air inlet 211 by welding, for example. A material of the water repellent film 26 is not limited to a specific one insofar as the material is generally used in the field of metal-air batteries and can be fixed to the first resin film 21. A thickness of the water repellent film 26 is preferably 0.05 mm to 0.5 mm.

The air electrode 23 is constituted by a current collector 231 and a catalyst layer 232 in contact with the current collector 231. Part of the current collector 231 is extended to the outside of the enclosure member and serves as a lead portion 233 of the laminated battery 20. A material of the current collector 231 is not limited to a specific one insofar as the material is generally used in the field of metal-air batteries. A thickness of the current collector 231 is preferably 0.05 mm to 0.5 mm.

The catalyst layer 232 contains at least an air electrode catalyst. The air electrode catalyst is a catalyst with at least an oxygen reduction ability. Practical examples of the air electrode catalyst include conductive carbons such as Ketjenblack, acetylene black, DENKA BLACK, carbon nanotubes, and fullerenes, metals, metal oxides, metal hydroxides, and metal sulfides. One or two or more selected from among the above-mentioned examples can be used as the air electrode catalyst. With use of the above-mentioned material(s), a three-phase interface where oxygen gas, water, and electrons coexist can be formed on the air electrode catalyst, and a discharge reaction can be progressed. When the laminated battery 20 is a primary battery, the catalyst layer 232 may contain a catalyst such as manganese dioxide. When the laminated battery 20 is a secondary battery, the catalyst layer 232 may contain not only the air electrode catalyst with the oxygen reduction ability, but also a catalyst with an oxygen generation ability. Thus, the catalyst layer 232 may contain a Bi-functional catalyst with both the oxygen generation ability and the oxygen reduction ability.

A mass percentage of the air electrode catalyst contained in the catalyst layer 232 is preferably 5% by mass or more of the catalyst layer 232. The air electrode catalyst layer may contain a binder in addition to the air electrode catalyst. Furthermore, a binder such as polytetrafluoroethylene can be used for the catalyst layer 232. A thickness of the catalyst layer 232 is preferably 0.1 mm or more and 1.0 mm or less.

The metal negative electrode 24 is in the form obtained by laminating an active material layer 242 on a current collector 241. In the metal negative electrode 24, however, the current collector 241 and the active material layer 242 are not required to be previously laminated into the integral form before they are put into the second storage portion S22. For example, the current collector 241 and particles of the negative electrode active material (for example, zinc or zinc oxide) may be separately put into the second storage portion S22 of the laminated battery 20 such that the negative electrode active material is laminated on the current collector 241. Alternatively, the metal negative electrode 24 may include the current collector 241 and colloidal slurry that is a mixture of the particles of the negative electrode active material and the electrolyte, both the current collector 241 and the colloidal slurry being put into the second storage portion S22 of the laminated battery 20. In the slurry, a ratio of weight of the electrolyte to weight of the negative electrode active material is preferably 0.3 to 2.0.

The negative electrode active material is selected as appropriate from among materials that are generally used in the field of metal-air batteries. For example, metal species such as cadmium species, lithium species, sodium species, magnesium species, lead species, zinc species, tin species, aluminum species, and iron species can be optionally used as the negative electrode active material. Because the negative electrode active material is reduced due to the charge, it may be in the state of a metal oxide.

A mean particle size of the negative electrode active material is preferably 1 nm to 500 μm. The mean particle size is more preferably 5 nm to 300 μm, even more preferably 100 nm to 250 μm, and particularly preferably 200 nm to 200 μm. The mean particle size can be measured by a particle size distribution measuring device.

Part of the current collector 241 is extended to the outside of the enclosure member and serves as a lead portion 243 of the laminated battery 20. A thickness of the current collector 241 is preferably 0.05 mm to 0.50 mm. A thickness of the active material layer 242 is preferably 1.0 mm to 10.0 mm.

In the laminated battery 20 according to Embodiment 2, the first resin film 21, the second resin film 22, the air electrode 23, the metal negative electrode 24, the separator 25, the water repellent film 26, and the electrolyte can be each given by suitable one of related-art components that have been used so far in the fields of laminated batteries and metal-air batteries.

The above description has been made, by way of example, in connection with the case in which the laminated battery 20 is the metal-air battery. However, when the laminated battery 20 is a general battery, a positive electrode may be used instead of the air electrode 23. The positive electrode in such a case includes a positive electrode active material layer instead of the catalyst layer 232. Moreover, when the laminated battery 20 is a general battery, the air inlet 211 and the water repellent film 26 are no longer required.

Figure 4:
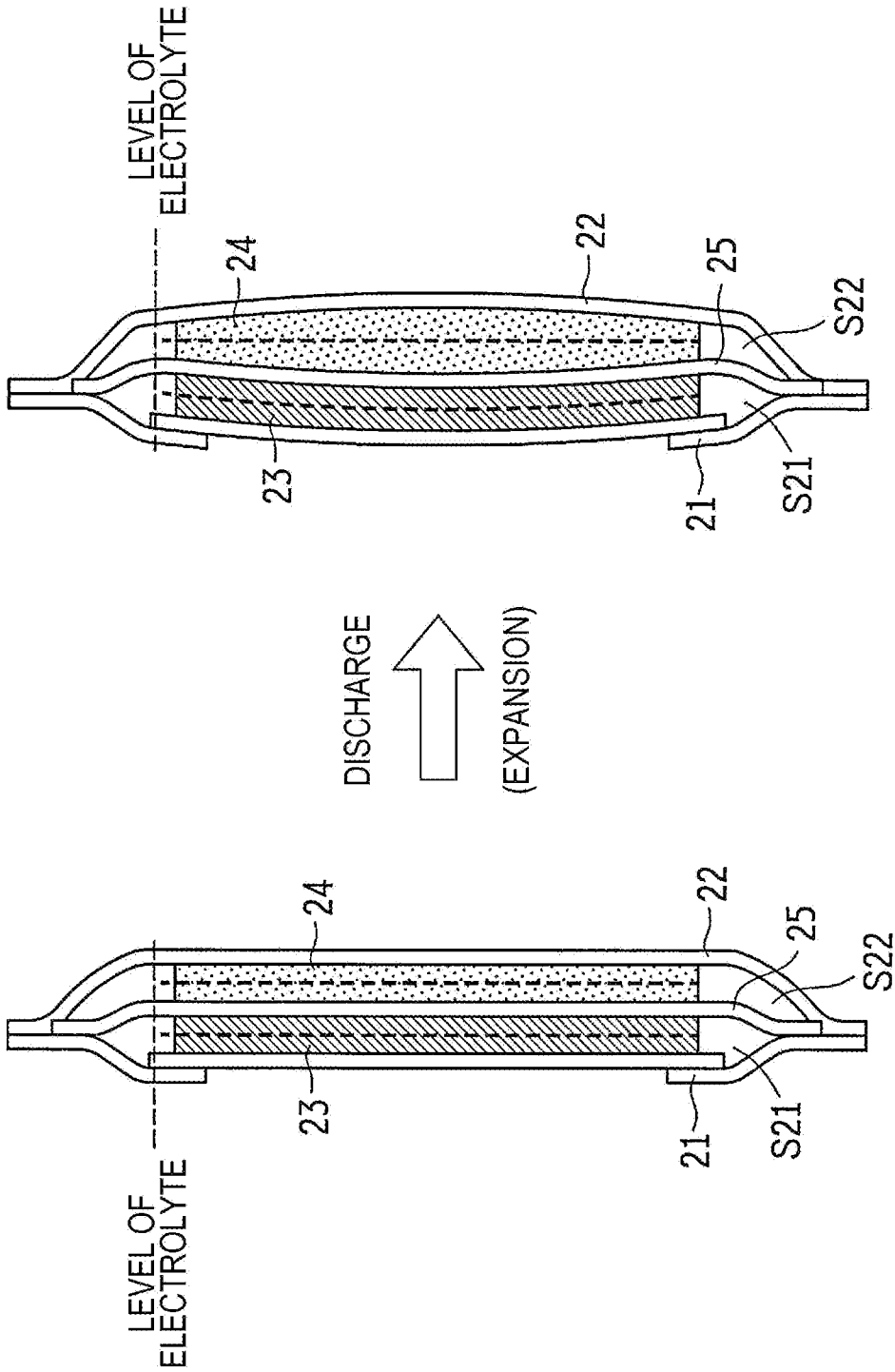
FIG. 4 represents explanatory sectional views illustrating change in shape of the laminated battery of FIG. 3, the change being attributable to discharge.

In the laminated battery 20 as well, the negative electrode active material used in the metal negative electrode 24 causes change in volume (expansion) during the discharge, and hence the shape of the laminated battery 20 is also changed. FIG. 4 represents explanatory sectional views illustrating change in shape of the laminated battery 20, the change being attributable to the discharge.

As illustrated in FIG. 4, in the laminated battery 20, even when the metal negative electrode 24 is expanded due to the discharge, a shift in position of the separator 25 is suppressed because the peripheral edge portion of the separator 25 is fixed to the enclosure member (the first resin film 21 in this embodiment). Therefore, the first storage portion S21 deforms following deformation of the second storage portion S22 in which the metal negative electrode 24 is disposed, and a gap can be avoided from being formed between the air electrode 23 serving as the positive electrode and the separator 25. As a result, a level drop of the electrolyte is suppressed, and reduction in battery capacity can be suppressed.

[Example of Manufacturing Method for Laminated Battery 20]

Figure 5:
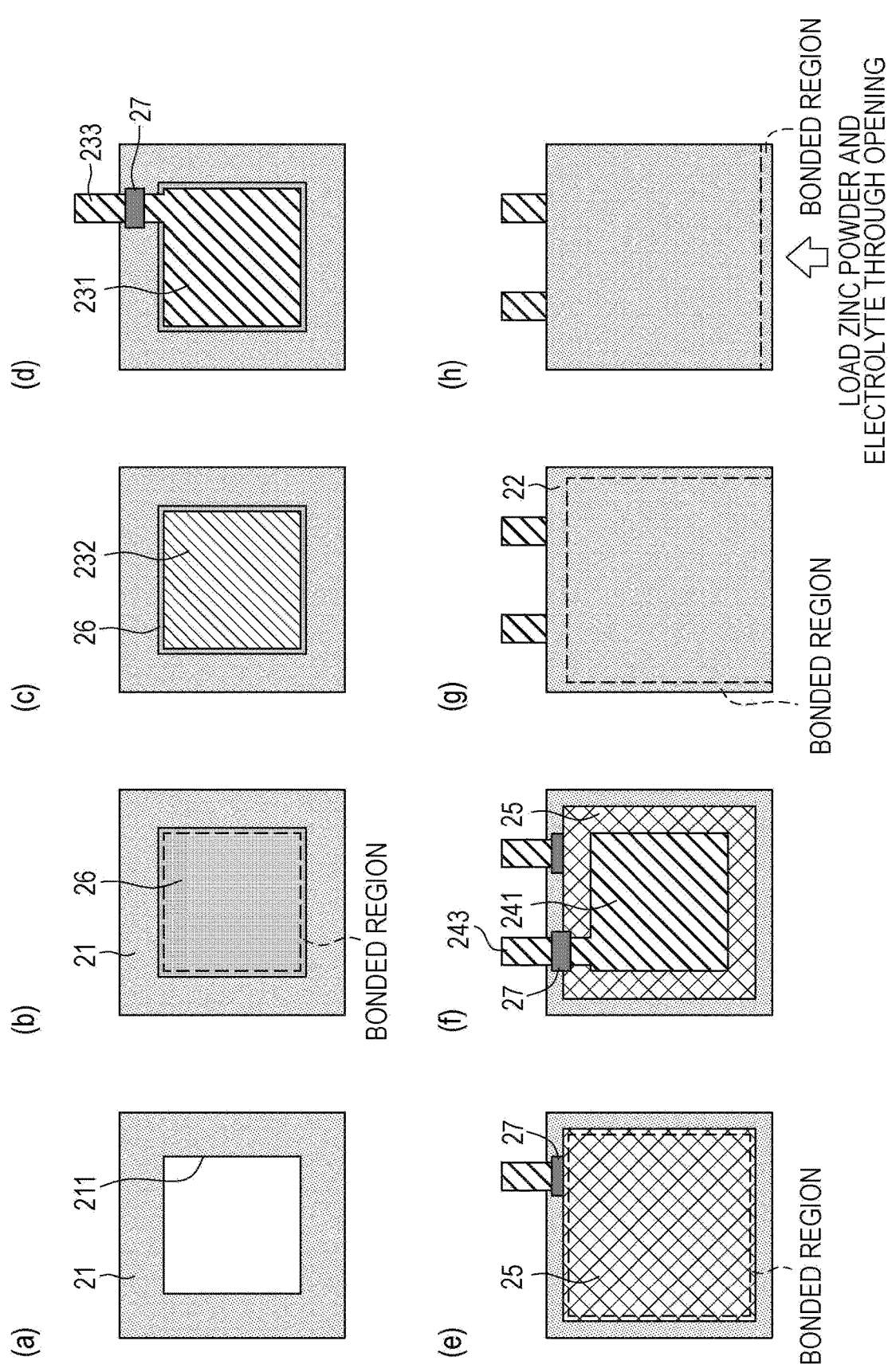
FIGS. 5(a) to 5(h) illustrate an example of a preferred manufacturing method for the laminated battery of FIG. 3.

An example of a preferred manufacturing method for the laminated battery 20 will be described below with reference to FIG. 5.

First, as illustrated in FIG. 5(a), the air inlet 211 is formed in the first resin film 21 (or the first resin film 21 including the air inlet 211 formed therein is prepared). Then, as illustrated in FIG. 5(b), the water repellent film 26 is bonded to the first resin film 21 to cover the air inlet 211. On that occasion, an area of the water repellent film 26 is set to be a little larger than that of the air inlet 211, and the water repellent film 26 is overlapped with an edge portion of the air inlet 211 and bonded to the edge portion by heat welding.

Then, as illustrated in FIG. 5(c), the catalyst layer 232 of the air electrode 23 is laminated on the water repellent film 26. Furthermore, as illustrated in FIG. 5(d), the current collector 231 of the air electrode 23 is laminated on the catalyst layer 232, and they are compressed together with a press. A tab film 27 may be affixed to both surfaces of the lead portion 233 in the current collector 231. The tab film 27 is to prevent leakage of the electrolyte from the surroundings of the lead portion 233 in the laminated battery 20. A material of the tab film 27 is not limited to a specific one, and suitable one of materials used so far in the field of laminated batteries can be used. For example, butyl rubber can be preferably used. The tab film 27 is preferably welded to the first resin film 21 as well. In the laminated battery 20, however, the tab film 27 is not an essential component.

Then, as illustrated in FIG. 5(e), the separator 25 is laminated on the current collector 231 and is bonded to the first resin film 21 by heat welding. On that occasion, an area of the separator 25 is set to be a little larger than that of the water repellent film 26, and a portion of the separator 25, the portion overlapping the first resin film 21, is welded to the first resin film 21. When the tab film 27 is used, a portion of the separator 25, the portion overlapping the tab film 27, is also bonded to the tab film 27 by heat welding. Here, a ratio of the area of the separator 25 to an area of the first resin film 21, including an opening area of the air inlet 211 as well, is preferably 0.55 to 0.95.

Then, as illustrated in FIG. 5(f), the current collector 241 of the metal negative electrode 24 is laminated on the separator 25. A tab film 27 may also be affixed to both surfaces of the lead portion 243 in the current collector 241.

Then, as illustrated in FIG. 5(g), the second resin film 22 is laminated on the current collector 241 to face each other and is bonded along three sides except for a lower side. On that occasion, at two lateral sides, heat welding is performed on at least overlapped portions of the resin films (the first resin film 21 and the second resin film 22). At an upper side, the heat welding is performed on at least overlapped portions of the first resin film 21, the second resin film 22, and the separator 25 (including the tab films 27 when used).

Finally, as illustrated in FIG. 5(h), zinc powder and an electrolyte are loaded into the inside through an opening at one side (lower side) that is not yet welded, and the resin films are bonded along the one side. At that time, because the separator 25 is already bonded to the first resin film 21, the loaded zinc powder is avoided from entering the first storage portion S21 (the space between the first resin film 21 and the separator 25). At the lower side, the heat welding is performed on overlapped portions of the resin films (the first resin film 21 and the second resin film 22). The electrolyte permeates into the air electrode 23 through the separator 25.

According to the above-described manufacturing method, since the separator 25 is bonded to the resin film (the first resin film 21 in this embodiment) forming the enclosure member, the battery can be assembled through the above-described steps just by laminating and bonding the individual members in the steps of FIGS. 5(a) to 5(g). As a result, a manufacturing process can be simplified, and cost reduction can be realized.

Embodiment 3

While the above-described Embodiments 1 and 2 disclose the battery structures when the present disclosure is applied to a primary battery (or a two-electrode secondary battery), a preferred battery structure in the case of applying the present disclosure to a three-electrode secondary batter including two positive electrodes (first and second positive electrodes) and a metal negative electrode disposed between the two positive electrodes is described in this Embodiment 3. Furthermore, while the following description is made, by way of example, in connection with the case in which the present disclosure is applied to a three-electrode metal-air secondary battery including a metal negative electrode and, as two positive electrodes, an air electrode and a charge electrode, the battery structure of the present disclosure can be further applied to a metal-air primary battery including two air electrodes and a metal negative electrode disposed between the two air electrodes and to general batteries other than metal-air batteries.

Figure 6:
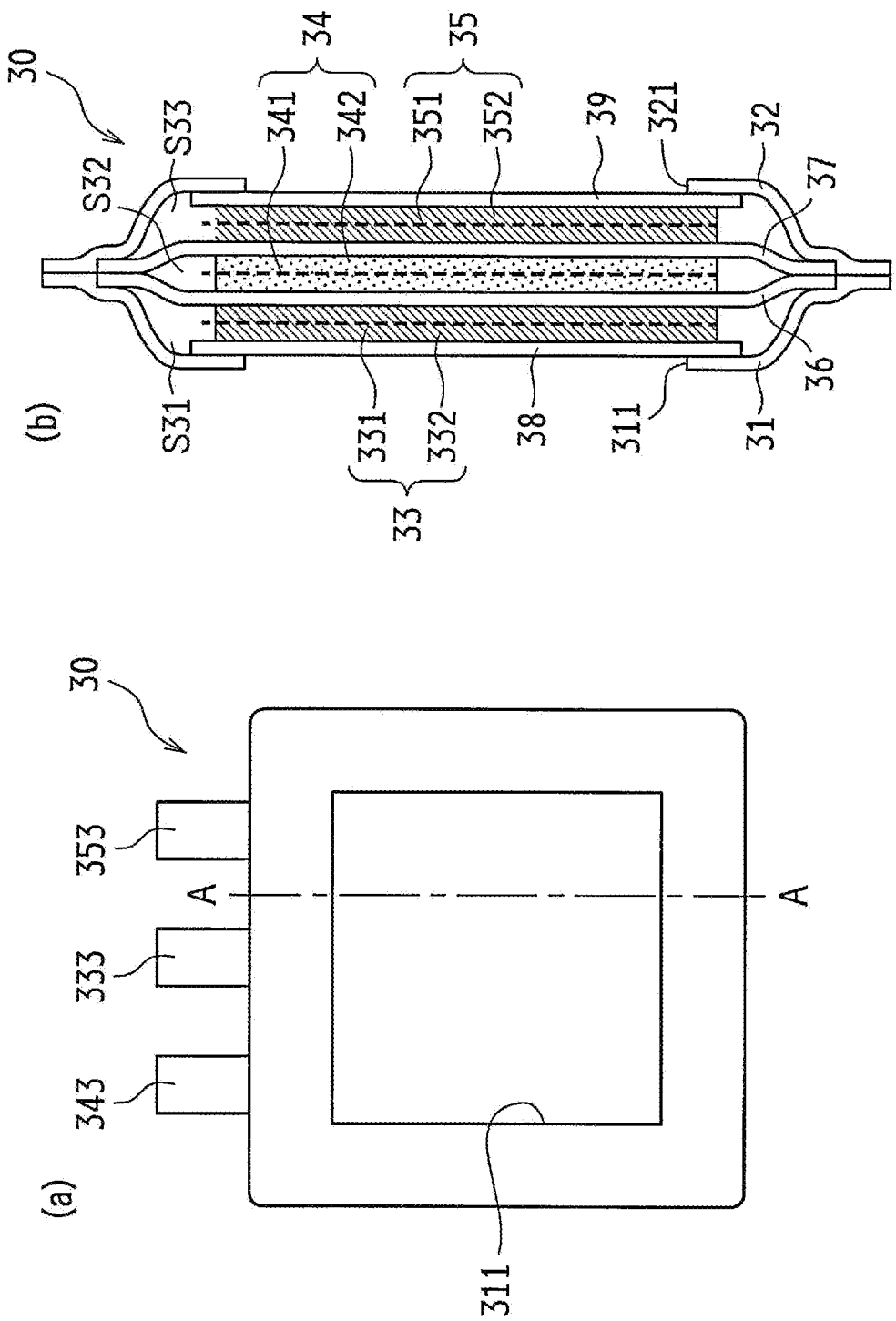
FIG. 6 illustrates a schematic structure of a laminated battery according to Embodiment 3; specifically.

FIG. 6 illustrates a schematic structure of a laminated battery 30 according to Embodiment 3; specifically, FIG. 6(a) is a plan view of the laminated battery 30, and FIG. 6(b) is a sectional view taken along A-A in FIG. 6(a).

As illustrated in FIG. 6, in the laminated battery 30, an enclosure member (battery case) is constituted by affixing a first resin film 31 and a second resin film 32 to each other. The laminated battery 30 includes an air electrode (first positive electrode) 33, a metal negative electrode 34, a charge electrode (second positive electrode) 35, a first separator 36, a second separator 37, a first water repellent film 38, and a second water repellent film 39 that are disposed inside the enclosure member. Furthermore, an electrolyte (not illustrated) is filled in the enclosure member.

The first separator 36 is arranged to face the first resin film 31, and a peripheral edge portion of the first separator 36 is bonded to a peripheral edge portion of the first resin film 31. A space between the first resin film 31 and the first separator 36 serves as a first storage portion S31, and the air electrode 33 and the first water repellent film 38 are disposed in the first storage portion S31. In more detail, an air inlet 311 is formed in the first resin film 31 as an opening through which air is to be taken in, and the first water repellent film 38 is bonded to the first resin film 31 to cover the air inlet 311. The air electrode 33 is arranged between the first water repellent film 38 and the first separator 36. A thickness of the first separator 36 is preferably 0.05 mm to 0.40 mm. A thickness of the first water repellent film 38 is preferably 0.05 mm to 0.50 mm.

The second separator 37 is arranged to face the second resin film 32, and a peripheral edge portion of the second separator 37 is bonded to a peripheral edge portion of the second resin film 32. A space between the second resin film 32 and the second separator 37 serves as a third storage portion S33, and the charge electrode 35 and the second water repellent film 39 are disposed in the third storage portion S33. In more detail, an air outlet 321 is formed in the second resin film 32 as an opening through which air is to be released, and the second water repellent film 39 is bonded to the second resin film 32 to cover the air outlet 321. The charge electrode 35 is arranged between the second water repellent film 39 and the second separator 37. A thickness of the second separator 37 is preferably 0.05 mm to 0.40 mm. A thickness of the second water repellent film 39 is preferably 0.05 mm to 0.50 mm.

Furthermore, the first separator 36 and the second separator 37 are arranged to face each other, and peripheral edge portions of the first separator 36 and the second separator 37 are bonded by heat welding or ultrasonic welding, for example. In other words, the first separator 36 and the second separator 37 bonded to each other at their peripheral edge portions constitute a bag separator, and a peripheral edge portion of the bag separator is fixed to the enclosure member. In addition, the peripheral edge portions of the first resin film 31 and the second resin film 32 are also preferably bonded to each other. A space between the first separator 36 and the second separator 37 (namely, the inside of the bag separator) serves as a second storage portion S32, and the metal negative electrode 34 is disposed in the second storage portion S32.

In the above-described example, the peripheral edge portions of the first separator 36 and the second separator 37 are bonded to constitute the bag separator. Strictly speaking, however, it is just required that the peripheral edge portion of the first separator 36 is bonded to the peripheral edge portion of the first resin film 31 and the peripheral edge portion of the second separator 36 is bonded to the peripheral edge portion of the second resin film 32. Stated in another way, it is not essential that the peripheral edge portions of the first separator 36 and the second separator 37 are bonded to constitute the bag separator.

In the laminated battery 30, the first water repellent film 38 and the second water repellent film 39 are disposed to prevent leakage of the electrolyte through the air inlet 311 and the air outlet 321 and have a function of separating gas and liquid.

The air electrode 33 is constituted by a current collector 331 and a catalyst layer 332 and can be provided in a similar structure to that of the air electrode 23 in Embodiment 2. A lead portion 333 is formed by part of the current collector 331, the part being extended to the outside of the enclosure member.

The charge electrode 35 is constituted by a current collector 351 and a catalyst layer 352, and the catalyst layer 352 may contain, for example, a conductive porous carrier and a charge electrode catalyst carried on the porous carrier. The charge electrode catalyst is a catalyst (such as nickel) with the oxygen generation ability and acts to progress a charge reaction during charge of the laminated battery 30. The catalyst layer 352 is made of, for example, foamed nickel. Parts of the current collectors 331 and 351 are extended to the outside of the enclosure member and serve as the lead portions 333 and 353 of the laminated battery 30, respectively. Foamed nickel can also be used for the current collector 331. In that case, the current collector 331 and the catalyst layer 332 are both incorporated in one member of foamed nickel. A thickness of the charge electrode 35 is preferably 0.2 mm to 2 mm.

The metal negative electrode 34 is in the form obtained by laminating an active material layer 342 on a current collector 341 and may have a similar structure to that of the metal negative electrode 24 in Embodiment 2. Part of the current collector 341 is extended to the outside of the enclosure member and serves as a lead portion 343 of the laminated battery 30.

In the laminated battery 30 according to Embodiment 3, as in Embodiments 1 and 2, the first resin film 31, the second resin film 32, the air electrode 33, the metal negative electrode 34, the charge electrode 35, the first separator 36, the second separator 37, the first water repellent film 38, the second water repellent film 39, and the electrolyte can be each given by suitable one of related-art components that have been used so far in the fields of laminated batteries and metal-air secondary batteries.

The above description has been made, by way of example, in connection with the case in which the laminated battery 30 is the metal-air secondary battery. However, when the laminated battery 30 is a general secondary battery, a first positive electrode for discharge may be used instead of the air electrode 33, and a second positive electrode for charge may be used instead of the charge electrode 35. The first positive electrode and the second positive electrode in such a case include positive electrode active material layers instead of the catalyst layers 332 and 352. When the laminated battery 30 is a general secondary battery, the air inlet 311, the air outlet 321, the first water repellent film 38, and the second water repellent film 39 are no longer required.

Furthermore, while the above description has been made, by way of example, in connection with the case in which the laminated battery 30 is the metal-air secondary battery, in the case of the laminated battery 30 being a metal-air primary battery, another air electrode 33 may be used instead of the charge electrode 35. In such a case, the air electrode 33 is arranged on each of front and rear sides of the metal negative electrode 34. Moreover, while the above description has been made in connection with the case in which the laminated battery 30 is the metal-air secondary battery in which the two positive electrodes separately have the function for the discharge and the function for the charge, an air electrode containing, in a catalyst layer, both a catalyst with the oxygen generation ability and a catalyst with the oxygen reduction ability may be used instead of each of the air electrode 33 and the charge electrode 35.

Figure 7:
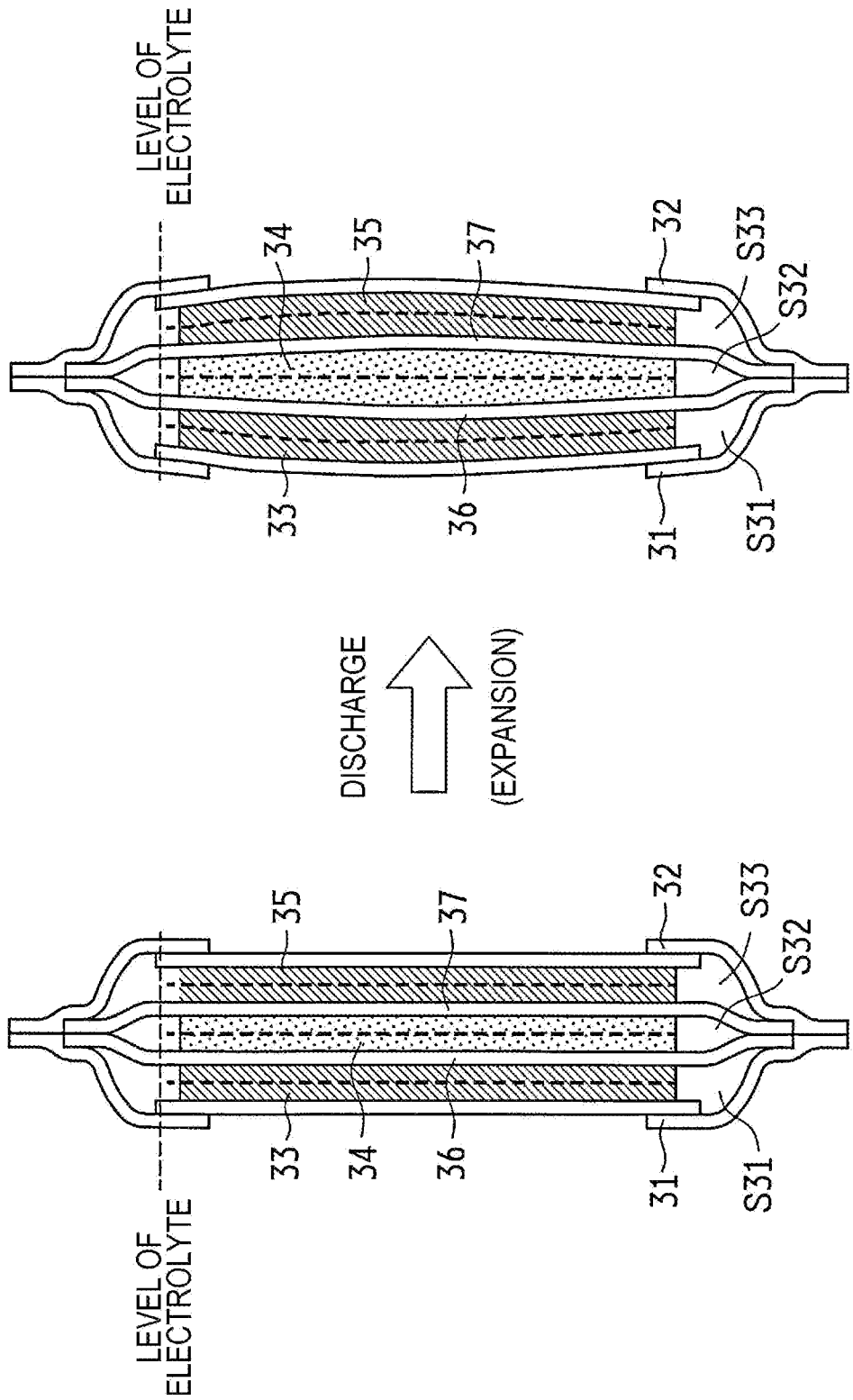
FIG. 7 represents explanatory sectional views illustrating change in shape of the laminated battery of FIG. 6, the change being attributable to discharge.

In the laminated battery 30 as well, the negative electrode active material used in the metal negative electrode 34 causes change in volume (expansion) during the discharge, and hence the shape of the laminated battery 30 is also changed. FIG. 7 represents explanatory sectional views illustrating change in shape of the laminated battery 30, the change being attributable to discharge.

As illustrated in FIG. 7, in the laminated battery 30, even when the metal negative electrode 34 is expanded due to the discharge, a shift in position of the separator (each of the first separator 36 and the second separator 37) is suppressed because the peripheral edge portion of the first separator 36 is fixed to the first resin film 31 forming the enclosure member and the peripheral edge portion of the second separator 37 is fixed to the second resin film 32 forming the enclosure member. Therefore, the first storage portion S31 and the third storage portion S33 deform inside the enclosure member following deformation of the second storage portion S32 in which the metal negative electrode 34 is disposed, and a gap can be avoided from being formed between the positive electrode (each of the air electrode 33 and the charge electrode 35) and the separator. As a result, a level drop of the electrolyte is suppressed, and reduction in battery capacity can be suppressed. Moreover, reduction in cycle life as the secondary battery can also be suppressed.

[Example of Manufacturing Method for Laminated Battery 30]

An example of a preferred manufacturing method for the laminated battery 30 will be described below with reference to FIG. 8.

Figure 8:
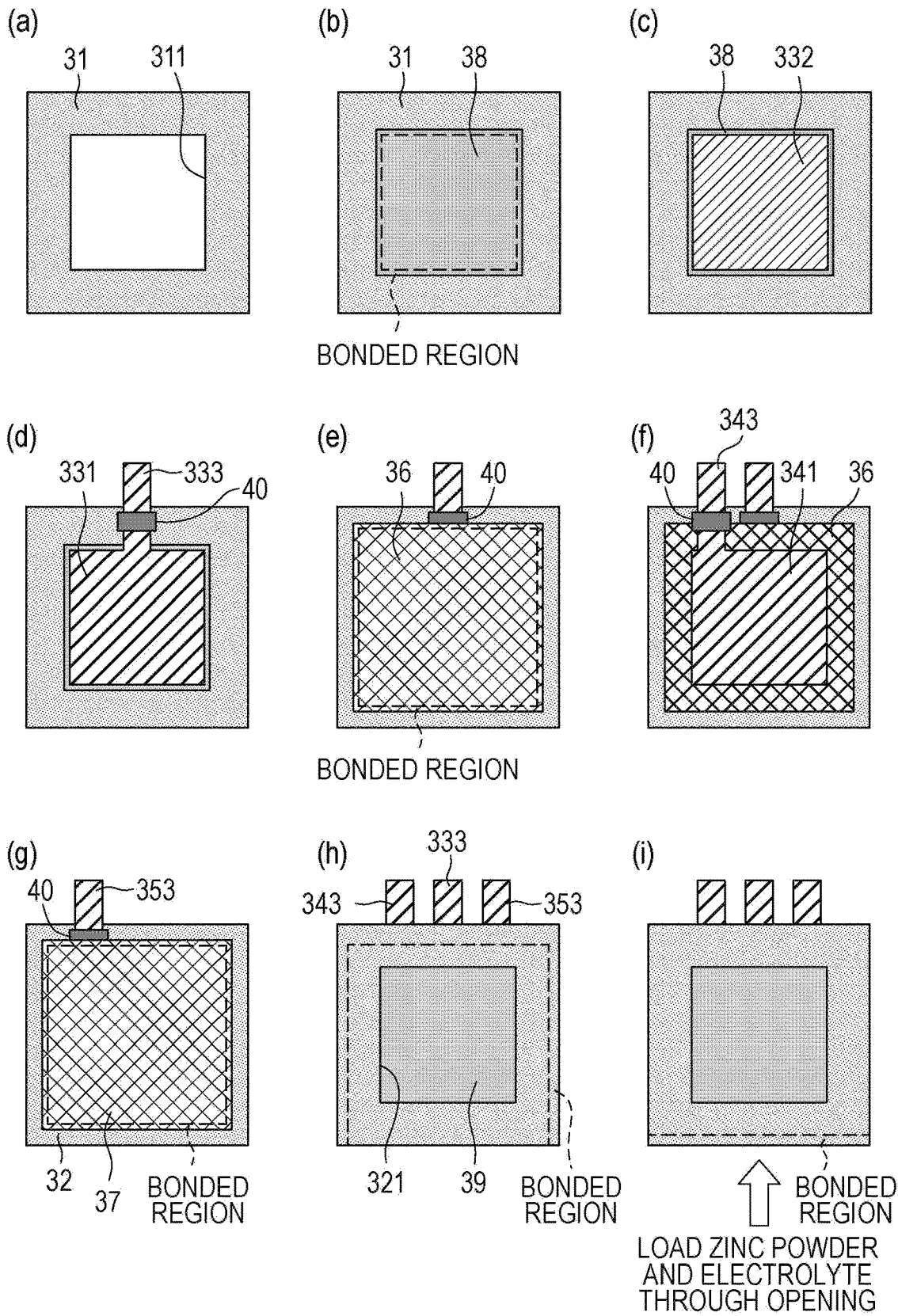
FIGS. 8(a) to 8(i) illustrate an example of a preferred manufacturing method for the laminated battery of FIG. 6.

First, as illustrated in FIG. 8(*a*), the air inlet 311 is formed in the first resin film 31 (or the first resin film 31 including the air inlet 311 formed therein is prepared). Then, as illustrated in FIG. 8(*b*), the first water repellent film 38 is bonded to the first resin film 31 to cover the air inlet 311. On that occasion, an area of the first water repellent film 38 is set to be a little larger than that of the air inlet 311, and the first water repellent film 38 is overlapped with an edge portion of the air inlet 311 and bonded to the edge portion by heat welding.

Then, as illustrated in FIG. 8(*c*), the catalyst layer 332 of the air electrode 33 is laminated on the first water repellent film 38. Furthermore, as illustrated in FIG. 8(*d*), the current collector 331 of the air electrode 33 is laminated on the catalyst layer 332, and they are compressed together with a press. A tab film 40 may be affixed to both surfaces of the lead portion 333 in the current collector 331.

Then, as illustrated in FIG. 8(*e*), the first separator 36 is laminated on the current collector 331 and is bonded to the first resin film 31. On that occasion, an area of the first separator 36 is set to be a little larger than that of the first water repellent film 38, and a portion of the first separator 36, the portion overlapping the first resin film 31, is welded to the first resin film 31. When the tab film 40 is used, a portion of the first separator 36, the portion overlapping the tab film 40, is also bonded to the tab film 40.

Then, as illustrated in FIG. 8(f), the current collector 341 of the metal negative electrode 34 is laminated on the first separator 36. A tab film 40 may also be affixed to both surfaces of the lead portion 343 in the current collector 341.

Furthermore, a laminate is formed through the same procedures as those described in FIGS. 8(a) to 8(e) by successively laminating and bonding the second resin film 32, the second water repellent film 39, the charge electrode 35 (the electrolyte layer 352 and the current collector 351), and the second separator 37 (see FIG. 8(g)). However, a position of a lead portion 353 in the charge electrode 35 is set to be shifted not to overlap the lead portions 333 and 343 in the air electrode 33 and the metal negative electrode 34.

A laminate obtained in the step of FIG. 8(f) and the laminate obtained in the step of FIG. 8(g) are laminated such that the first separator 36 and the second separator 37 are positioned to face each other with the current collector 341 of the metal negative electrode 34 interposed therebetween, and both the laminates are bonded along three sides except for a lower side (see FIG. 8(h)). On that occasion, at two lateral sides, heat welding is performed on at least overlapped portions of the resin films (the first resin film 31 and the second resin film 32). At an upper side, the heat welding is performed on at least overlapped portions of the first resin film 31, the second resin film 32, the first separator 36, and the second separator 37 (including the tab films 40 when used).

Finally, as illustrated in FIG. 8(i), zinc powder and an electrolyte are loaded into the inside through an opening at one side (lower side) that is not yet welded, and the resin films are bonded along the one side. At that time, because the first separator 36 is already bonded to the first resin film 31 and the second separator 37 is already bonded to the second resin film 32, the loaded zinc powder is avoided from entering the first storage portion S31 and the third storage portion S33. At the lower side, the heat welding is performed on overlapped portions of the resin films (the first resin film 31 and the second resin film 32).

According to the above-described manufacturing method, since the separators (the first separator 36 and the second separator 37) forming the second storage portion are bonded to the resin films (the first resin film 31 and the second resin film 32) forming the enclosure member, the battery can be assembled through the above-described steps just by laminating and bonding the individual members in the steps of FIGS. 8(a) to 8(h). In other words, a step of forming two separators into a bag-shaped separator, a step of putting the negative electrode into the bag-shaped separator, and a step of putting the bag-shaped separator into the enclosure member are no longer required. As a result, a manufacturing process can be simplified, and cost reduction can be realized.

The embodiments disclosed herein are merely illustrative in all respects and do not provide the basis for restrictive interpretation. Thus, the technical scope of the present disclosure is not to be interpreted based on only the above-described embodiments and is to be defined based on the statements of Claims. In addition, all modifications not departing from the meaning and the scope equivalent to those of Claims also fall within the present disclosure.

The invention claimed is:

1. A laminated battery including a positive electrode, a negative electrode, and a separator that are laminated inside an enclosure member,
wherein the enclosure member is formed by affixing a first resin film and a second resin film to each other,
the separator is arranged inside the enclosure member between the negative electrode and the positive electrode,
a peripheral edge portion of the separator is fixed to a peripheral edge portion of of the first resin film,
the positive electrode includes a first positive electrode arranged to face the first resin film, and a second positive electrode arranged to face the second resin film,
the negative electrode is arranged between the first positive electrode and the second positive electrode,
the separator includes a first separator arranged between the negative electrode and the first positive electrode, and a second separator arranged between the negative electrode and the second positive electrode, and
a peripheral edge portion of the first separator is fixed to the peripheral edge portion of the first resin film, and a peripheral edge portion of the second separator is fixed to a peripheral edge portion of the second resin film.

2. The laminated battery according to claim 1,
wherein the positive electrode further includes an air electrode including a catalyst layer with an oxygen reduction ability,
the enclosure member includes an air inlet on a side facing the positive electrode, and
a water repellent film is arranged between the positive electrode and the air inlet.

3. The laminated battery according to claim 1,
wherein the positive electrode further includes an air electrode including a catalyst layer with both an oxygen reduction ability and an oxygen generation ability,
the enclosure member includes an air inlet on a side facing the positive electrode, and
a water repellent film is arranged between the positive electrode and the air inlet.

4. The laminated battery according to claim 1,
wherein the first positive electrode is an air electrode including a catalyst layer with an oxygen reduction ability,
the second positive electrode is a charge electrode including a catalyst layer with an oxygen generation ability,
the enclosure member includes an air inlet on a side facing the first positive electrode and an air outlet on a side facing the second positive electrode, and
water repellent films are arranged between the first positive electrode and the air inlet and between the second positive electrode and the air outlet.

5. The laminated battery according to claim 1,
wherein the first positive electrode is a first air electrode including a catalyst layer with an oxygen reduction ability,
the second positive electrode is a second air electrode including a catalyst layer with an oxygen reduction ability,
the enclosure member includes a first air inlet on a side facing the first positive electrode and a second air inlet on a side facing the second positive electrode, and
water repellent films are arranged between the first positive electrode and the first air inlet and between the second positive electrode and the second air inlet.

6. The laminated battery according to claim 3,
wherein a ratio of an area of the separator to an area of the first resin film, including an opening area of the air inlet, is 0.55 to 0.95.

7. The laminated battery according to claim 1,
wherein the peripheral edge portion of the first separator and the peripheral edge portion of the second separator are directly bonded to each other.

8. A laminated battery including a positive electrode, a negative electrode, and a separator that are laminated inside an enclosure member,
wherein the enclosure member is formed by affixing a first resin film and a second resin film to each other,
the separator is arranged inside the enclosure member between the negative electrode and the positive electrode,
a peripheral edge portion of the separator is fixed to a peripheral edge portion of at least one of the first resin film and the second resin film, and
the negative electrode includes a slurry containing an electrolyte and a negative electrode active material dispersed in the electrolyte, and a current collector in contact with the slurry.

9. A manufacturing method for the laminated battery according to claim 1, the manufacturing method comprising:
laminating the positive electrode on the first resin film to face each other;
laminating the separator on the positive electrode and welding the peripheral edge portion of the separator to the peripheral edge portion of the first resin film;
laminating a current collector of the negative electrode on the separator;
laminating the second resin film to face the current collector of the negative electrode, and welding the first resin film and the second resin film along three sides except for one side; and
loading particles of a negative electrode active material for the negative electrode and an electrolyte through an opening at the one side where the first and second resin films have not been welded, and thereafter welding the first and second resin films along the one side that has been left open.

10. A manufacturing method for the laminated battery according to claim 1, the manufacturing method comprising:
laminating the first positive electrode on the first resin film to face each other;
laminating the first separator on the first positive electrode and welding the peripheral edge portion of the first separator to the peripheral edge portion of the first resin film;
laminating a current collector of the negative electrode on the first separator;
laminating the second positive electrode on the second resin film to face each other;
laminating the second separator on the second positive electrode and welding the peripheral edge portion of the second separator to the peripheral edge portion of the second resin film;
laminating a laminate obtained in the laminating of the current collector of the negative electrode on the first separator and a laminate obtained in the laminating of the second separator on the second positive electrode, such that the first separator and the second separator face each other with the current collector of the negative electrode interposed therebetween, and welding the first resin film and the second resin film along three sides except for one side; and
loading particles of a negative electrode active material for the negative electrode and an electrolyte through an opening at the one side where the first and second resin films have not been welded, and thereafter welding the first and second resin films along the one side that has been left open.

11. The manufacturing method according to claim 9,
wherein a ratio of a weight of the electrolyte to a weight of the particles of the negative electrode active material is 0.3 to 2.0.

12. A manufacturing method for the laminated battery according to claim 8, the manufacturing method comprising:
laminating the positive electrode on the first resin film to face each other;
laminating the separator on the positive electrode and welding the peripheral edge portion of the separator to the peripheral edge portion of the first resin film;
laminating a current collector of the negative electrode on the separator;
laminating the second resin film to face the current collector of the negative electrode and welding the first resin film and the second resin film along three sides except for one side; and
loading particles of a negative electrode active material for the negative electrode and an electrolyte through an opening at the one side where the first and second resin films have not been welded, and thereafter welding the first and second resin films along the one side that has been left open.

13. A manufacturing method for the laminated battery according to claim 8, the manufacturing method comprising:
laminating the first positive electrode on the first resin film to face each other;
laminating a first separator on the first positive electrode and welding a peripheral edge portion of the first separator to the peripheral edge portion of the first resin film;
laminating a current collector of the negative electrode on the first separator;
laminating the second positive electrode on the second resin film to face each other;
laminating a second separator on the second positive electrode and welding a peripheral edge portion of the second separator to the peripheral edge portion of the second resin film;
laminating a laminate obtained in the laminating of the current collector of the negative electrode on the first separator and a laminate obtained in the laminating of the second separator on the second positive electrode, such that the first separator and the second separator face each other with the current collector of the negative electrode interposed therebetween, and welding the first resin film and the second resin film along three sides except for one side; and
loading particles of a negative electrode active material for the negative electrode and an electrolyte through an opening at the one side where the first and second resin films have not been welded, and thereafter welding the first and second resin films along the one side that has been left open.

14. The manufacturing method according to claim 12,
wherein a ratio of a weight of the electrolyte to a weight of the particles of the negative electrode active material is 0.3 to 2.0.

15. The laminated battery according to claim 1,
wherein the negative electrode includes a slurry containing an electrolyte and a negative electrode active material dispersed in the electrolyte, and a current collector in contact with the slurry.

* * * * *